H. F. MARANVILLE.
TREAD CURING PRESS.
APPLICATION FILED APR. 10, 1920.

1,365,115.

Patented Jan. 11, 1921.
4 SHEETS—SHEET 1.

Witness:

INVENTOR
Harvey F. Maranville
BY
ATTORNEY

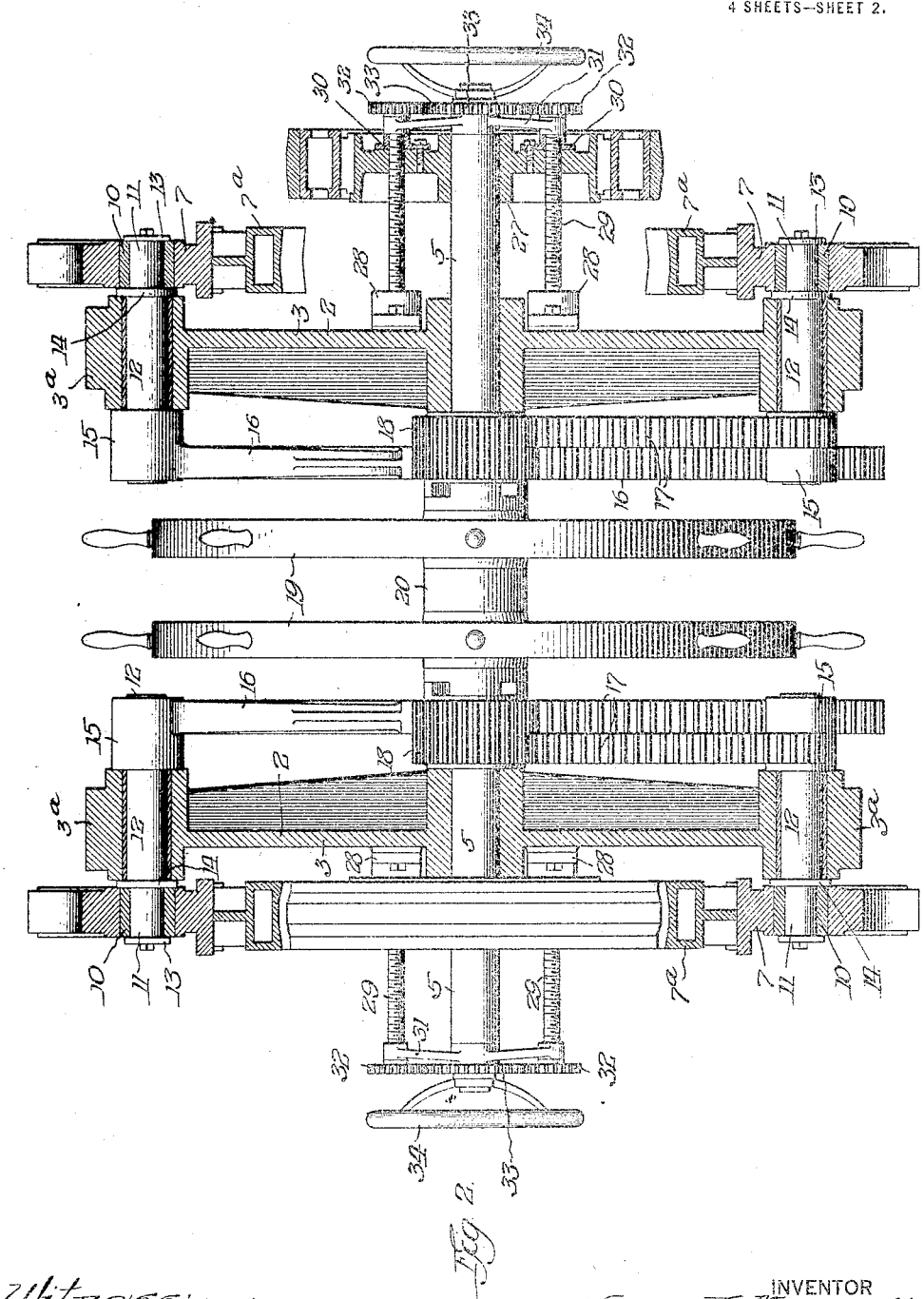

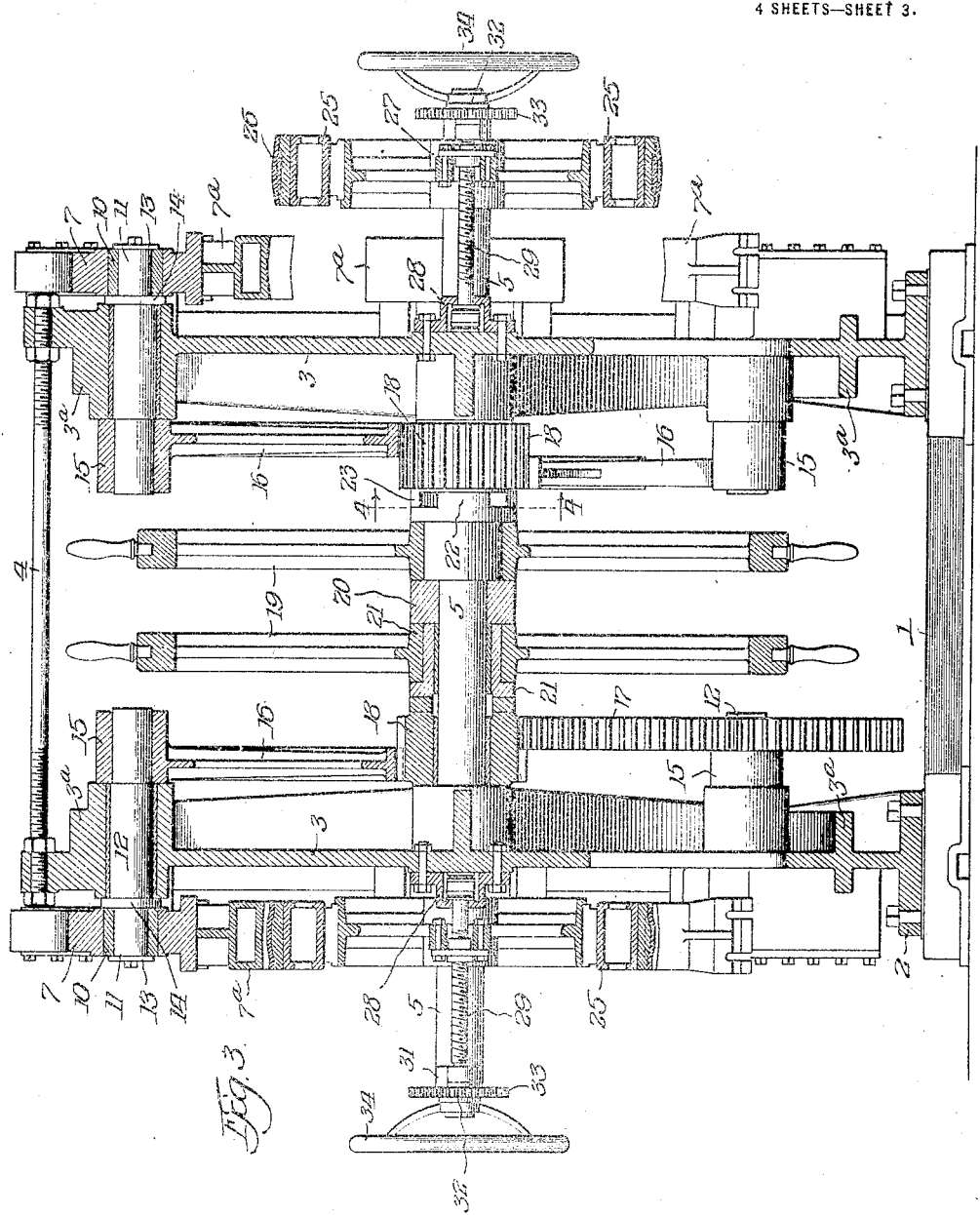

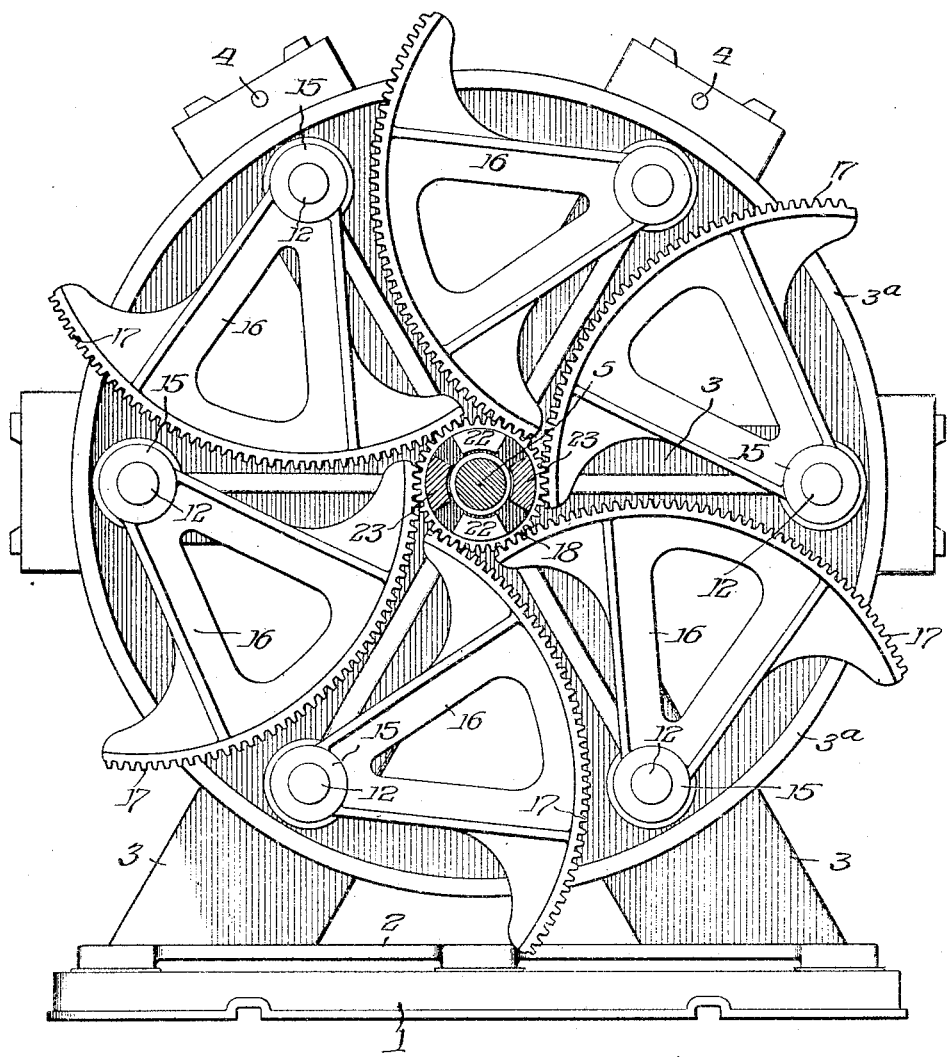

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

TREAD-CURING PRESS.

1,365,115.  Specification of Letters Patent.  Patented Jan. 11, 1921.

Application filed April 10, 1920. Serial No. 372,987.

*To all whom it may concern:*

Be it known that I, HARVEY F. MARANVILLE, a citizen of the United States, residing at Akron, in the county of Summit, State of Ohio, have invented certain new and useful Improvements in Tread-Curing Presses, of which the following is a specification.

This invention relates to an apparatus for curing treads for use in manufacturing tires, especially that type of tire known as the "two cure" tire in which an endless circular band of tread rubber is semi-cured and placed over a semi-cured carcass, the two being given a second or final cure.

It has been the practice heretofore to manufacture the semi-cured tread on a drum or circular form, about which is placed a band of uncured rubber. The rubber is then wrapped tightly with wet rags and placed in an open heater where the curing takes place and at which operation the pressure of the rags causes the rubber to flow into the cavities or depressions on the surface of the drum forming the skid preventing configuration on the band. In applying the semi-cured bands to the carcass of the tire, the band is turned inside out bringing the raised letters or other forms on the tread to the outer circumference of the tire.

The operation described has several disadvantages. It requires a large number of drums or forms, which are expensive, and occupy a considerable floor space. The wrapping of the drum is a tedious operation and requires skill on the part of the operator. The results are not always the best, and cloth wrappings are expensive and require a number of operators to roll in condition for rewrapping of the treads. Furthermore, the cost of supplying these wraps is a large item in the expense of producing the non-skid bands.

To obviate these difficulties, I propose to construct a press which will mechanically compress the rubber on the tread drum. The press is connected with steam or some other heating element so that the treads are cured in place on the drum, obviating the necessity of providing a large amount of this equipment. In addition, accurate and positive pressure is permitted which will produce better tread bands.

I am aware that attempts have been made to devise mechanical presses for the purpose of curing the non-skid bands, but as far as I am advised, they have not been successful.

In the drawing is illustrated one form of my invention, it being understood that changes and additions may be made without departing from the spirit of the invention or sacrificing any of its benefits.

Fig. 2 is a horizontal section.

Fig. 3 is a longitudinal vertical section.

Fig. 4 is a cross section through the machine taken on the line 4—4 of Fig. 3.

Figure 1:
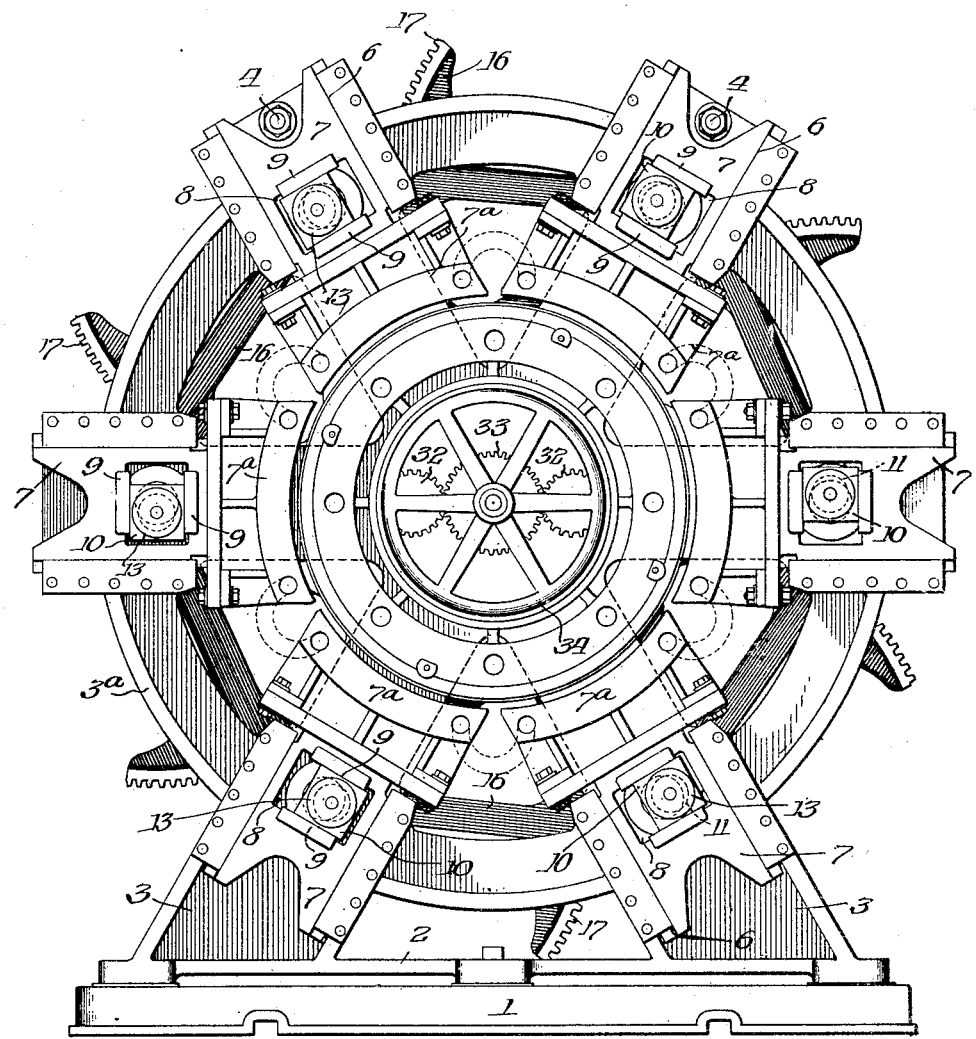
Figure 1 is a front elevation of my improved tread curing press.

The machine illustrated herein is in duplicate, and although this is not essential, it is an economical means of operating as it permits one of the drums being unloaded and refilled while a tread is being vulcanized on the other.

It comprises a base or foundation plate 1 which is H-shaped, the parallel arms supporting the frames of the machines.

These frames are indicated by the numeral 2 and are formed with a plurality of radiating arms 3 connected by a circular brace 3ª, the lower arms being secured to the base plate. The standards are duplicated on the two sides of the machine as are the other parts of the apparatus so that a description of one only will be given. The two standards are connected by tie rods 4 at their upper extremities and through the center of the standards passes a shaft 5.

On the outer ends of each of the arms 3 is formed a guideway or channel 6 in which is mounted a slide 7. On the lower or inner end of each slide is secured a compressor or shoe 7ª, the inner surface whereof is formed on the arc of a circle, the six shoes, when in their innermost positions, forming a complete circle the size required for the outer circumference of the tread band as cured. Midway of each slide is formed a recess or opening 8, the sides of which are formed with bearing surfaces 9. Between the said surfaces is carried a block or slide 10 in which is received the eccentric head 11 formed on the outer end of a short shaft 12, which is mounted on the end of the arm 3. A cap plate 13 holds the slide 7 in place. The shaft 12 is kept in place by a collar 14 at one side of the standard and by the hub 15 of a sector 16.

The sectors are shown in Fig. 4, and comprise fan-shaped gear segments, the curved surfaces of which bear inwardly and are formed with gear teeth 17. All of these gear segments mesh with a common pinion 18 rotatably mounted on the center shaft 5. This pinion is wide enough to permit the gear segments being placed in staggered relation. It will be seen that as the gear 18 is rotated, the segments will be rocked and the slides 7 will be moved radially through the eccentrics.

Between the two standards are carried two hand wheels or capstans 19, one for each side of the machine separated by a collar 20. Each capstan is shrunk on a sleeve 21, the outer surface of which is formed with a pair of teeth or lugs 22 which engage between similar teeth or lugs 23 formed on the side of the pinion 18.

By operation of the capstan or hand wheel 19 a powerful leverage may be exerted as it is multiplied through the mechanism described, which will exert sufficient pressure to cure the rubber properly and force it into the recesses of the form or drum.

The forms or drums are slidably mounted on the outer end of the center shaft and are located concentrically with respect to the shoes 8. The construction and operation of these drums is shown in Fig. 2.

The drum is indicated by the numeral 25, its outer surface being engraved, as at 26, to form the projections on the tread and is formed with a hub 27 which slides on the end of the shaft 5. Secured to the face of the upright is a pair of bearings 28 which rotatably support screw-threaded shafts 29, the free ends of which engage nuts 30 secured to the face of the drum. To the projecting end of the shaft 5 is secured a bracket 31, the ends of the arms forming bearings for the shafts 29. To the free ends of the shafts are fastened pinions 32 which mesh with a centrally located gear 33. Attached to the gear 33 is a hand wheel 34 by which the gear may be rotated, moving the drum longitudinally of the shaft 5.

The operation of the apparatus may be briefly described as follows:

One drum may be in curing position and one in stripping and refilling position, as shown at the left and right respectively, of Fig. 2. The one which is in stripping position on the outer end of the shaft is covered with a fresh uncured band of rubber and moved back into position in line with the shoes 8, by operation of the hand wheel 34. The capstan 19 is now rotated moving the shoes in toward the drum, exerting pressure on the tread throughout its circumference. The shoes and drum may be heated by any means, that shown comprising a series of steam chambers which may be connected with any suitable source of supply for the heating fluid. When the rubber has been softened sufficiently, an additional pressure is given by rotating the handle to give a final squeeze to the tread. The connection afforded by the teeth 22 and 23 enables the operator to move the shoe by a series of blows delivered by the capstan wheel, as will be understood. While the tread just inserted is being cured, the shoe on the other side may be withdrawn and the drum moved outwardly.

The invention claimed herein is subject to modifications on the exact form shown, and details and proportions may be varied without altering the scope of the appended claims.

I claim:

1. In an apparatus of the character set forth, a tread drum, a plurality of arc shaped members arranged to move radially with respect to the drum, and means to move the drum axially.

2. In an apparatus of the character set forth, a supporting shaft, a drum slidably mounted on said shaft, a plurality of radially movable slides, arc shaped members on said slides, and mechanical means to move the slides simultaneously.

3. In an apparatus of the character set forth, a supporting shaft, a drum mounted on said shaft, a plurality of radially movable slides arranged about the drum, arc shaped compressors secured to said slides, said compressors when in their innermost position describing a circle, and a system of mechanically operated leverage to move said compressors.

4. In an apparatus of the character set forth, a supporting shaft, a drum mounted on said shaft, a plurality of radially movable slides arranged about the drum, arc shaped compressors secured to said slides, said compressors when in their innermost position describing a circle, a system of mechanically operated leverage to move said compressors, and means to shift said drum and said compressors relatively to one another.

5. In an apparatus of the character set forth, a form on which tread bands may be molded, a plurality of radially movable compressors arranged about said form, an eccentric for each said compressor to move it radially, and a common operating means for said eccentrics.

6. In an apparatus of the character set forth, the combination of a form on which tread bands may be vulcanized, a plurality of radially movable compressors arranged about said form, a single lever mechanism, and power multiplying connections from said lever mechanism to said compressors.

7. In an apparatus of the character set forth, the combination of a circular form on which tread bands may be vulcanized, a plurality of radially movable compressors arranged about said form, a single lever mechanism, and power multiplying connections from said lever mechanism to said compressors to move them radially and means to shift said forms relatively to said compressors.

8. In an apparatus of the character set forth, the combination of a form on which tread bands may be vulcanized, a plurality of radially movable compressors arranged about said form, a single lever mechanism, multiplying connections from said lever mechanism to said compressors, and mechanism to move said form outwardly from the plane of said compressors.

9. In an apparatus of the character set forth, a main supporting shaft, a drum slidably mounted on said shaft, a frame work adjacent the drum, a plurality of radially movable slides arranged about the drum, an eccentric in each said slide to move it radially, means to rock said eccentric, a hand wheel on said shaft, and lever mechanism connecting said hand wheel with said slides.

10. In an apparatus of the character set forth, a main supporting shaft, a drum slidably mounted on said shaft, a frame work adjacent the drum, a plurality of radially movable slides arranged about the drum, an eccentric in each said slide to move it radially, means to rock said eccentric, a hand wheel on said shaft, a pinion on said shaft connected with said hand wheel, rocking gear sectors intermeshing with said pinion, said gear sectors operating said eccentrics.

HARVEY F. MARANVILLE.